United States Patent
Tong et al.

(10) Patent No.: US 8,994,670 B2
(45) Date of Patent: Mar. 31, 2015

(54) ELECTRONIC DEVICE HAVING TOUCH-SENSITIVE DISPLAY AND METHOD OF CONTROLLING SAME TO IDENTIFY TOUCHES ON THE TOUCH-SENSITIVE DISPLAY

(75) Inventors: Kuo-Feng Tong, Waterloo (CA); Jeffrey John Paul Dippel, Waterloo (CA); Kevin Paul Timmerman, Waterloo (CA)

(73) Assignee: Blackberry Limited, Waterloo (CA)

( * ) Notice: Subject to any disclaimer, the term of this patent is extended or adjusted under 35 U.S.C. 154(b) by 347 days.

(21) Appl. No.: 13/187,802

(22) Filed: Jul. 21, 2011

(65) Prior Publication Data

US 2013/0021263 A1 Jan. 24, 2013

(51) Int. Cl.
G06F 3/041 (2006.01)
G06F 3/045 (2006.01)
G06F 3/0488 (2013.01)

(52) U.S. Cl.
CPC .. *G06F 3/04883* (2013.01); *G06F 2203/04808* (2013.01)
USPC .......................................... 345/173; 345/174

(58) Field of Classification Search
None
See application file for complete search history.

(56) References Cited

U.S. PATENT DOCUMENTS

| 6,888,536 | B2 | 5/2005 | Westerman et al. |
| 2008/0316183 | A1 | 12/2008 | Westerman et al. |
| 2009/0273571 | A1 | 11/2009 | Bowens |
| 2010/0020029 | A1 | 1/2010 | Park et al. |
| 2010/0097342 | A1 | 4/2010 | Simmons et al. |
| 2010/0259499 | A1 | 10/2010 | Kaikuranta et al. |
| 2010/0309139 | A1* | 12/2010 | Ng ................................. 345/173 |
| 2011/0037727 | A1* | 2/2011 | Lee et al. ....................... 345/174 |
| 2011/0302519 | A1* | 12/2011 | Fleizach et al. ............... 345/173 |
| 2012/0206373 | A1* | 8/2012 | Van Eerd et al. ............. 345/173 |
| 2012/0256846 | A1* | 10/2012 | Mak .............................. 345/173 |

FOREIGN PATENT DOCUMENTS

FR 2797077 2/2001

OTHER PUBLICATIONS http://www.eetimes.com/design/industrial-control/4010429/Not-all-touch-screens-are-created-equal—published Mar. 8, 2010.
http://www.billbuxton.com/multitouchOverview.html—Version published Dec. 23, 2010 (Original Jan. 12, 2007).
Office Action dated Feb. 22, 2013, issued in respect of corresponding European Patent Application No. 11174924.8.
European Patent Application No. 11174924.8, Search Report dated Dec. 8, 2011.
Examiner's Report dated Sep. 12, 2013, issued in respect of corresponding Canadian Patent Application No. 2,747,036.
Examiner's Report dated Oct. 16, 2014, issued in respect of corresponding Canadian Patent Application No. 2,747,036.

* cited by examiner

*Primary Examiner* — Dwayne Bost
*Assistant Examiner* — Maheen Javed
(74) *Attorney, Agent, or Firm* — Geoffrey deKleine; Borden Ladner Gervais LLP

(57) ABSTRACT

A method includes detecting a first touch at a first touch location on a touch-sensitive display, detecting a second touch at a second touch location on the touch-sensitive display, and when a first distance from the first touch location to the second touch location meets a distance threshold and a second distance from the previous touch location to the first touch location does not meet the distance threshold, identifying the second touch as a new touch.

17 Claims, 3 Drawing Sheets

ELECTRONIC DEVICE HAVING TOUCH-SENSITIVE DISPLAY AND METHOD OF CONTROLLING SAME TO IDENTIFY TOUCHES ON THE TOUCH-SENSITIVE DISPLAY

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with displays are desirable.

DETAILED DESCRIPTION

Figure 1:
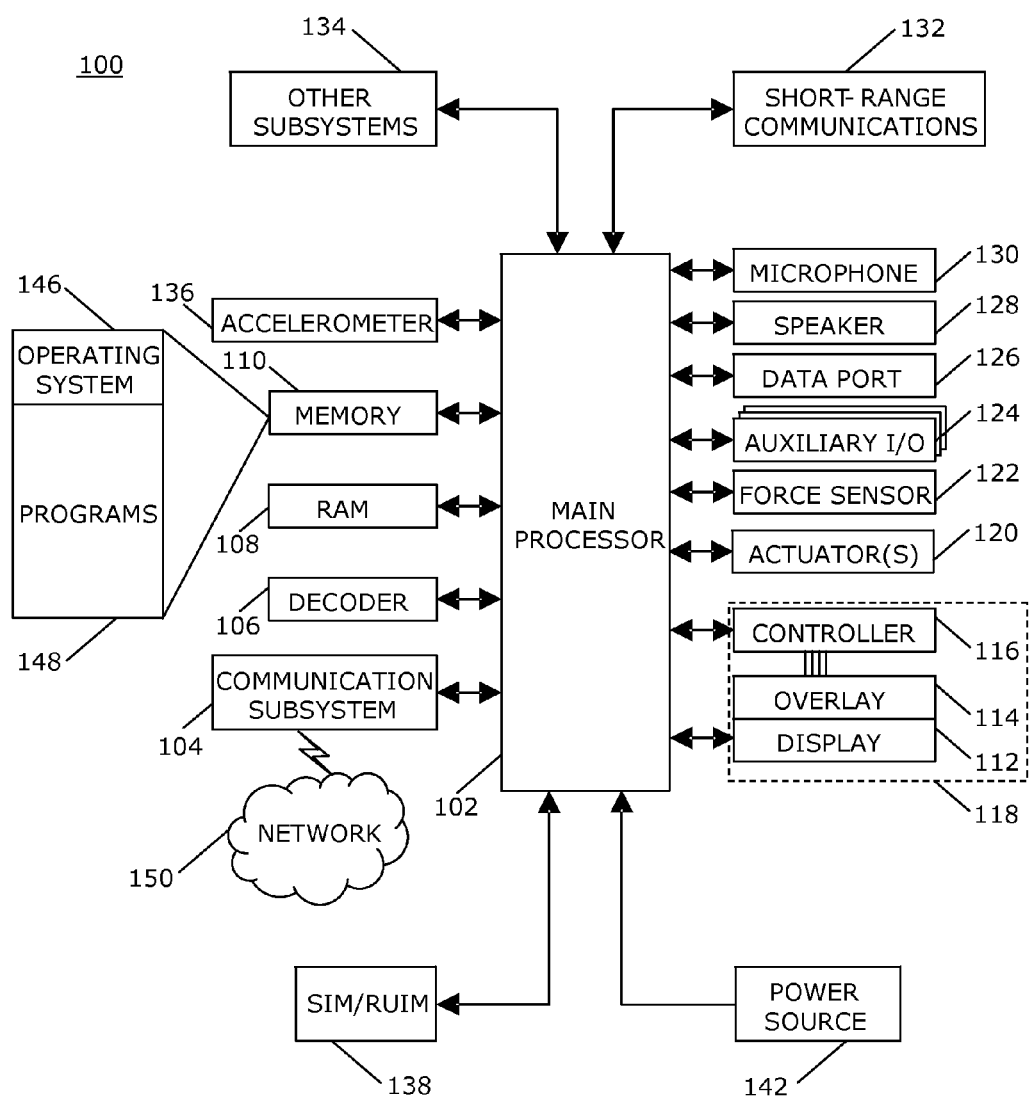
FIG. 1 is a block diagram of a portable electronic device in accordance with an example embodiment.

The following describes an electronic device and a method that includes detecting a first touch at a first touch location on a touch-sensitive display, detecting a second touch at a second touch location on the touch-sensitive display, and when a first distance from the first touch location to the second touch location meets a distance threshold and a second distance from the previous touch location to the first touch location does not meet the distance threshold, determining that the second touch is a new touch.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable or non-portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. Examples of non-portable electronic devices include electronic white boards, smart boards utilized for collaboration, built-in displays in furniture or appliances, and so forth. The electronic device may be a portable electronic device without wireless communication capabilities, such as a handheld electronic game, digital photograph album, digital camera, media player, e-book reader, and so forth.

A block diagram of an example of an electronic device 100 is shown in FIG. 1. The electronic device 100, which may be a portable electronic device, includes multiple components, such as a processor 102 that controls the overall operation of the electronic device 100. The electronic device 100 presently described optionally includes a communication subsystem 104 and a short-range communications 132 module to perform various communication functions, including data and voice communications. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on an electronic device, is displayed on the touch-sensitive display 118 via the processor 102. The processor 102 may interact with an orientation sensor such as an accelerometer 136 to detect direction of gravitational forces or gravity-induced reaction forces, for example, to determine the orientation of the electronic device 100.

To identify a subscriber for network access, the electronic device 100 may optionally use a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs or components 148 that are executed by the processor 102 and are typically stored in a persistent, updatable storage such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable contact member, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

An optional force sensor 122 or force sensors is disposed in any suitable location, for example, between the touch-sensitive display 118 and a back of the electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
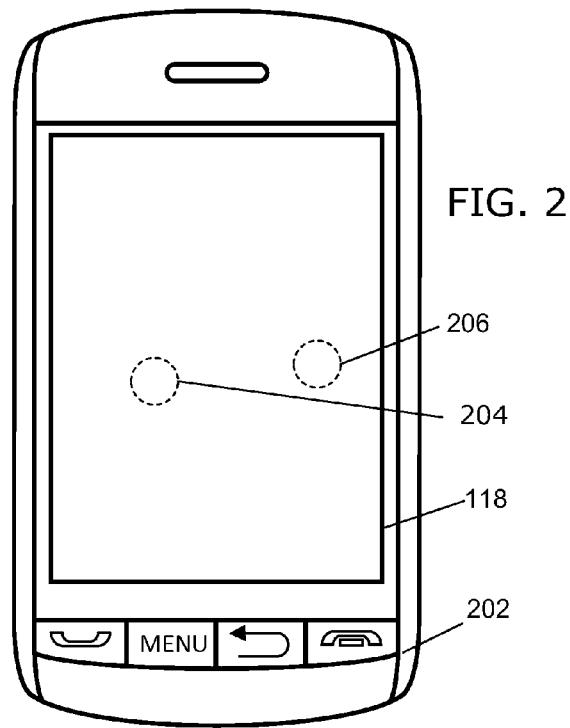
FIG. 2 illustrates examples of touch locations on a touch-sensitive display of an electronic device in accordance with the disclosure.

Touch locations on a touch-sensitive display 118 of an electronic device 100 are shown in FIG. 2. The electronic device 100 includes a housing 202 and the housing 202 and the touch-sensitive display 118 enclose components such as the components shown in FIG. 1. The touch locations illustrated may be touch locations of touches detected by the touch-sensitive display 118 and reported to the processor 102 of the electronic device 100. For the purpose of this example, one touch at a touch location 204 is reported to the processor 102 of the electronic device 100, and the other touch at a touch location 206 is reported to the processor 102 in the next report to the processor 102. In other words, the touches are not detected simultaneously. The touches are detected and the touch locations are reported in consecutive reports from the touch-sensitive display 118 to the processor 102.

The touch at the touch location 204 and the touch at the touch location 206 may be associated with a single touch such as a gesture on the touch-sensitive display 118. Alternatively, the touches at the touch locations 204, 206 may be separate touches. The touches at the touch locations 204, 206 may be separate touches that are reported in consecutive reports from the touch-sensitive display 118 when a user alternately touches using thumbs or fingers on the touch-sensitive display 118 when typing utilizing a virtual keyboard, for example. Incorrect identification of the touches as a single touch may cause two separate touches to be reported from an operating system layer to an application layer as a swipe. Incorrect identification of the touches as two separate touches may cause a single swipe to be reported as two separate touches. The application layer provides services that support applications such as software for file transfers, database access, and email.

Figure 3:
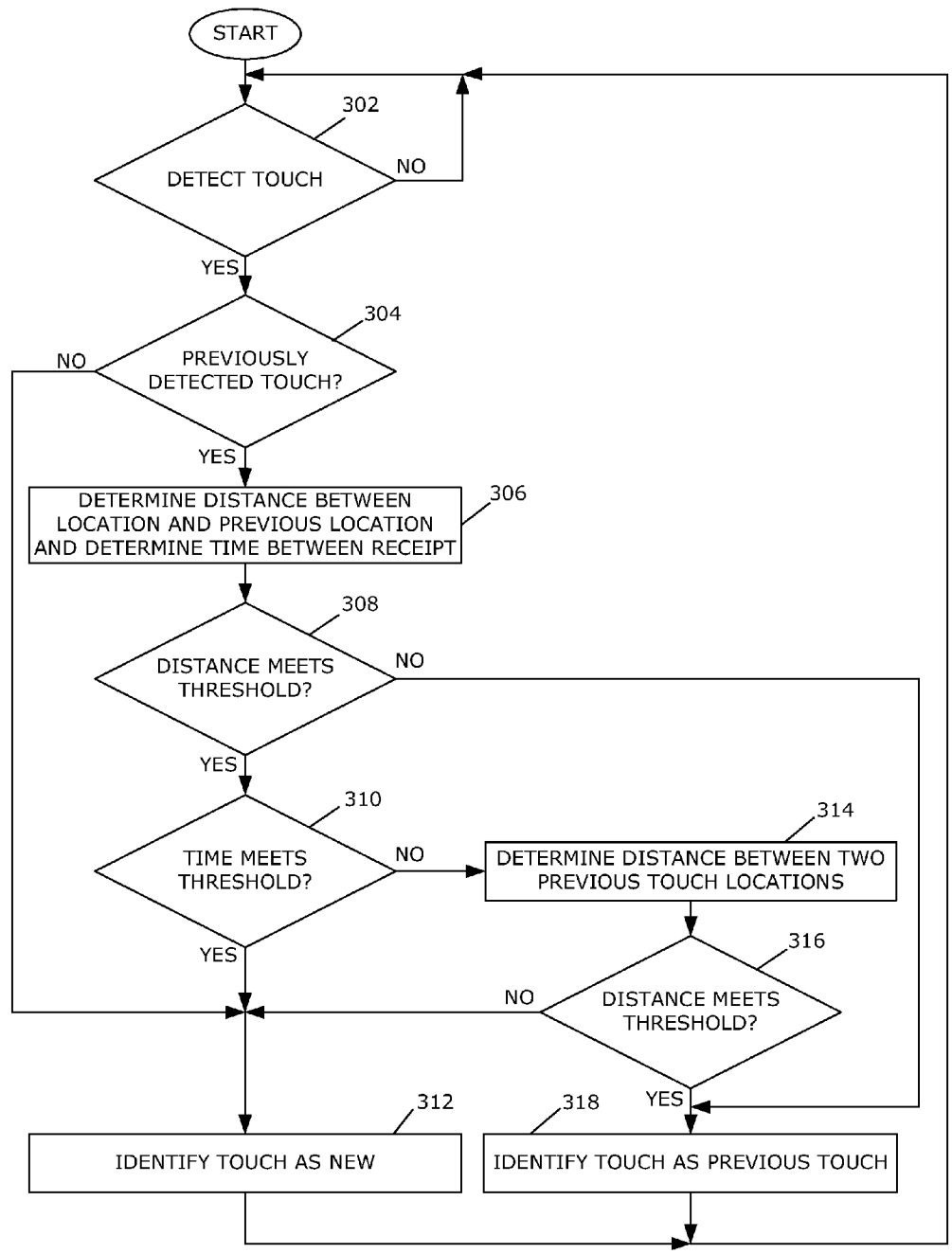
FIG. 3 is a flowchart illustrating a method of controlling the portable electronic device in accordance with the disclosure.

A flowchart illustrating a method of determining when a touch, such as the touch at the touch location 206, is a new touch is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium. New touches include separate touches and distinct touches. A new touch is not part of a separate or distinct touch, for example, which separate or distinct touch occurs at a different time or occurs at a different location than the location of the new touch.

When a touch is detected 302, the process continues at 304. A touch may be detected when touch data including a touch location is reported by the controller 116 to the processor 102, for example, to an operating system layer. The controller 116 may filter data by reporting touch locations when the location differs from the last-reported touch location by at least a threshold value. When the location of a touch, determined from a scan of the touch-sensitive display 118, is not changed or does not change by a distance that meets the threshold, the location is not reported to the operating system layer. The difference meets the threshold when the difference is equal to or greater than the threshold. The threshold value may be any suitable numerical value such that a touch location that is sufficiently different from the previously reported touch location is reported to the processor 102, and a touch location that is equal or very close to the previously reported touch location is ignored or not reported. The threshold is utilized to reduce the number of reported touch locations to the operating system layer, reducing signal traffic. The threshold is set at a suitable value to reduce reports of touch locations that differ by a very small distance from the previously reported touch location resulting, for example, from noise or jitter, while reporting changes in touch locations that result from movement of the touch relative to the touch-sensitive display 118.

When a touch was previously detected based on the last report from the controller 116 to the processor 102 at 304, the process continues at 306. The last report is the report that immediately precedes the report when the touch is detected at 302. When a touch was not detected in the last report from the controller 116, the touch detected at 302 is identified 312 as a new touch, and the new touch is reported to the application layer.

The distance between the location of the touch detected at 302 and the location of the previously detected touch is determined 306. The distance is determined based on the touch data when the touch is detected at 302 and the previous touch data from the last report. The duration of time between receipt of the report when the touch is detected at 302 and receipt of the last report is also determined at 306.

When the distance determined at 306 meets a distance threshold 308, the process continues at 310. When the distance determined at 306 does not meet the distance threshold 308, the touch detected at 302 is identified 318 as associated with the previous touch detected in the last report. The distance meets the distance threshold when the distance is equal to or greater than the threshold. The distance threshold value may be any suitable numerical value such that detected touches that are located close together are identified as associated with the previous touch. A threshold that is too high may lead to separate or distinct touches that are incorrectly identified as a gesture. A threshold that is too low may lead to gestures that are incorrectly identified as separate or distinct touches.

When the time determined at 306 meets a time threshold at 310, the touch detected at 302 is identified 312 as a new touch. Thus, when the distance between the touches meets a distance threshold and the time between reports meets a time threshold, the touch detected at 302 is identified 312 as a new touch and the previous touch is determined to have ended. The new touch may be reported to the application layer. The time may meet the time threshold when the time is equal to or greater than the threshold. The time threshold value may be any suitable numerical value such that when the reports are spaced apart in time, touches that are not located close together are identified as separate touches. This identification is based on the assumption that a touch that does not move for a threshold period of time is unlikely to suddenly move a large distance in the short time period between scans of the touch-sensitive display 118.

When the time determined at 306 does not meet the time threshold at 310, a distance between the locations of the two previously detected touches is determined 314. The distance is determined based on the touch data received from the last two reports, prior to detecting the touch at 302. The distance may be a linear distance from point to point, for example. Touch data from two prior reports is utilized to determine the distance at 314. When the distance determined at 314 meets the distance threshold at 316, the touch detected at 302 is identified 318 as associated with the previous touch detected in the last report. When the distance determined at 314 does not meet the distance threshold at 316, the touch detected at 302 is identified 312 as a new touch and the previous touch is determined to have ended. The distance threshold may be the same distance threshold utilized at 308. Thus, the touch detected at 302 is identified as a new touch or as associated with the previous touch based on two previously reported touch locations and the touch location reported at 302. This determination is based on the assumption that the speed of movement of a touch is unlikely to change such that a touch that previously moved a short distance, moves a large distance in the short time period between scans of the touch-sensitive display 118.

Figure 4:
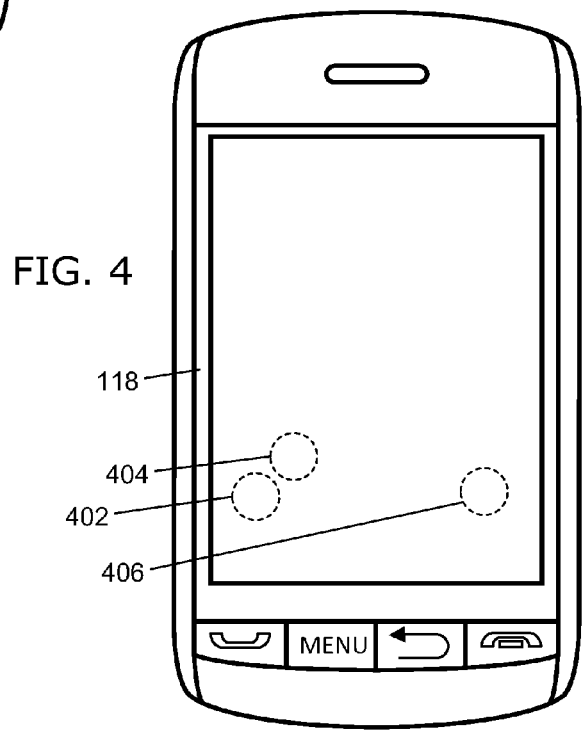
FIG. 4 illustrates examples of touch locations on a touch-sensitive display of an electronic device in accordance with the disclosure.

Examples of touch locations on a touch-sensitive display 118 of an electronic device 100 are shown in FIG. 4. For the purpose of this example, a touch is detected and the touch location 402 is reported to the processor 102. Another touch is detected and the touch location 404 is reported in the next report to the processor 102. Another touch is detected and the touch location 406 is reported in the next report to the processor 102. The touches are detected and the locations 402, 404, 406 are reported in three consecutive reports to the processor 102. Touch information including the touch locations 402, 404, 406 and the time of receipt of the reports of the touches, or time of detection, is temporarily stored in memory, such as RAM 108. Touch information may be stored for the touches and may be discarded or deleted from memory when the associated touch ends. Touch information may also be discarded when the number of touch reports exceeds a predetermined number such that touch information for the oldest touch report is discarded when a new touch report is saved.

When the touch is detected at the touch location 406, the touch at the location 404 that was detected in the last report from the controller 116 to the processor 102 is utilized to determine whether the touch 406 is a new touch or is associated with the previously detected touch. The distance between the touch location 406 and the touch location 404 is determined and the time between the reports when the touches at the touch locations 404, 406 are detected is determined.

For the purpose of this example, the distance between the touch location 406 and the touch location 404 meets the distance threshold. When the time meets the time threshold, the touch at the touch location 406 is identified as a new touch. When the time does not meet the time threshold, the distance between the two previous touches at the touch locations 402, 404 is determined. When the distance between the touch locations 402, 404 meets the distance threshold, the touch at the touch location 406 is identified as associated with the previous touch at the touch location 404. When the distance between the touch locations 402, 404 does not meet the distance threshold, the touch at the touch location 406 is identified as a new touch, separate of the touch at the touch location 404. In the example illustrated in FIG. 4, the distance between the two previous touch locations 402, 404 is small and does not meet the distance threshold. The touch 406 is identified as a new touch.

The portable electronic device 100 illustrated in FIG. 2 and FIG. 4 is one example of an electronic device and other electronic devices may be utilized.

A method includes detecting a first touch at a first touch location on a touch-sensitive display, detecting a second touch at a second touch location on the touch-sensitive display, and when a first distance from the first touch location to the second touch location meets a distance threshold and a second distance from the previous touch location to the first touch location does not meet the distance threshold, determining that the second touch is a new touch.

An electronic device includes a touch-sensitive display, and a processor coupled to the touch-sensitive display to detect a first touch at a first touch location on the touch-sensitive display, detect a second touch at a second touch location on the touch-sensitive display, and when a first distance from the first touch location to the second touch location meets a distance threshold and a second distance from a previous touch location to the first touch location does not meet the distance threshold, identify the second touch as a new touch.

A method includes detecting a first touch at a first touch location on a touch-sensitive display, detecting a second touch at a second touch location on the touch-sensitive display, detecting a third touch at a third touch location on the touch-sensitive display, and determining that the third touch is a new touch or is identified as associated with the second touch based on the first touch location, the second touch location, and the third touch location.

Utilizing information including the time between detecting touches or receipt of reports including touch locations, and the touch locations of previously detected touches, the electronic device may identify when a touch is a new touch and identify when a touch is associated with the previously detected touch with improved accuracy. Thus, touch location data is more accurately interpreted.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a first touch at a first touch location on a touch-sensitive display;
   detecting a second touch at a second touch location on the touch-sensitive display;
   detecting a previous touch at a previous touch location prior to detecting the first touch at the first location;
   determining a time between receipt of a first report of the first touch from a controller of the touch-sensitive display and receipt of a second report of the second touch from the controller;
   comparing the time to a time threshold;
   when a first distance from the first touch location to the second touch location is greater than a distance threshold and the time is less than the time threshold:
     identifying the second touch as a separate touch from the first touch when a second distance from the previous touch location to the first touch location is less than the distance threshold; and
     identifying the first touch and the second touch as one touch when the second distance is greater than the distance threshold;
   wherein a previous report of the previous touch, the first report, and the second report are received from the controller in consecutive reports from the controller.

2. The method according to claim 1, comprising identifying the second touch as new when the first distance is greater than the distance threshold and the time is greater than the time threshold.

3. The method according to claim 1, comprising identifying the first touch and the second touch as one touch when the first distance is less than the distance threshold.

4. The method according to claim 1, wherein the previous touch, the first touch, and the second touch are detected in three consecutive reports from the touch-sensitive display.

5. The method according to claim 1, comprising identifying the first touch as ended when the second touch is identified as the separate touch.

6. A non-transitory computer-readable storage device having computer-readable code executable by at least one processor of the electronic device to perform the method of claim 1.

7. An electronic device comprising:
   a touch-sensitive display;
   a processor coupled to the touch-sensitive display and configured to:
     detect a first touch at a first touch location on the touch-sensitive display;
     detect a second touch at a second touch location on the touch-sensitive display;
     detect a previous touch at a previous touch location prior to detecting the first touch;
     determine a time between receipt of a first report of the first touch from a controller of the touch-sensitive display and receipt of a second report of the second touch from the controller;
     compare the time to a time threshold;
     when a first distance from the first touch location to the second touch location is greater than a distance threshold and the time is less than the time threshold:
       identify the second touch as a separate touch from the first touch when a second distance from a previous touch location to the first touch location is less than the distance threshold; and
       identify the first touch and the second touch as one touch when the second distance is greater than the distance threshold;
   wherein a previous report of the previous touch, the first report, and the second report are received from the controller in consecutive reports frOm the controller.

8. The electronic device according to claim 7, wherein the processor identifies the second touch as new when the first distance is greater than the distance threshold and the time is greater than the time threshold.

9. The electronic device according to claim 7, wherein the processor identifies the first touch and the second touch as one touch when the first distance is less than the distance threshold.

10. The electronic device according to claim 7, wherein the previous touch, the first touch, and the second touch are detected in three consecutive reports from the touch-sensitive display.

11. The electronic device according to claim 7, wherein the processor determines that the first touch has ended when the second touch is identified as the separate touch.

12. A method comprising:
    detecting a first touch at a first touch location on a touch-sensitive display;
    detecting a second touch at a second touch location on the touch-sensitive display;
    detecting a third touch at a third touch location on the touch-sensitive display;
    determining a time between receipt of a second report of the second touch and receipt of a third report of the third touch;
    comparing the time to a time threshold;
    when a first distance from the second touch location to the third touch location is greater than a distance threshold and the time is less than the time threshold:
        identifying the second touch as ended and the third touch as a separate touch from the second touch when a second distance from the first touch to the second touch is less than the distance threshold; and
        identifying the second touch and the third touch as one touch when the second distance is greater than the distance threshold;
    wherein a first report of the first touch, the second report, and the third report are received from the touch-sensitive display in consecutive reports.

13. The method according to claim 12, comprising identifying the third touch as new when the first distance is greater than the distance threshold and the time is greater than the time threshold.

14. The method according to claim 12, identifying the second touch and the third touch as one touch when the first distance is less than the distance threshold.

15. The method according to claim 12, wherein the first touch, the second touch, and the third touch are detected in consecutive reports from the touch-sensitive display.

16. The method according to claim 12, comprising reporting, by a controller of the touch-sensitive display, the first touch location, the second touch location, and the third touch location.

17. The method according to claim 12, wherein the first touch and the second touch are detected in consecutive reports from the touch-sensitive display.

* * * * *